(12) United States Patent
Reineck

(10) Patent No.: US 6,918,182 B2
(45) Date of Patent: Jul. 19, 2005

(54) TAILORED WALL THICKNESS AXLE BEAM

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/666,087

(22) Filed: Sep. 19, 2003

(65) Prior Publication Data

US 2005/0062341 A1 Mar. 24, 2005

(51) Int. Cl.$^7$ .......................... B21D 53/88; B60B 35/00
(52) U.S. Cl. ..................................... 29/897.2; 301/125
(58) Field of Search ............................... 29/897.2, 897; 301/125, 124.1

(56) References Cited

U.S. PATENT DOCUMENTS

| | | |
|---|---|---|
| 2,085,829 A * | 7/1937 | Rogers .................... 29/897.35 |
| 4,435,972 A | 3/1984 | Simon |
| 5,287,768 A | 2/1994 | Amborn et al. |
| 5,320,580 A | 6/1994 | Simon |
| 5,406,819 A | 4/1995 | Wang et al. |
| 5,522,246 A | 6/1996 | Simon |
| 5,855,416 A | 1/1999 | Tasker et al. |
| 6,550,869 B2 | 4/2003 | Dantele |
| 6,585,331 B2 * | 7/2003 | Varela ........................ 301/125 |
| 6,722,037 B2 * | 4/2004 | Nees et al. ................ 29/897.2 |

\* cited by examiner

*Primary Examiner*—Marc Jimenez
(74) *Attorney, Agent, or Firm*—Carlson, Gaskey & Olds

(57) ABSTRACT

An axle assembly of this invention includes an axle beam having a top section, a bottom section and two side sections. The top and bottom sections are of a first thickness that is greater than the thickness of material comprising the two side sections. The thicknesses of each of the sections are tailored to carry expected loads. The top and bottom sections are the primary load bearing sections for loads exerted on the axle. Therefore, the top and bottom sections are of increased thickness and the side sections that encounter a reduced load are of a reduced thickness, providing a more efficient use of material.

11 Claims, 3 Drawing Sheets

TAILORED WALL THICKNESS AXLE BEAM

BACKGROUND OF THE INVENTION

This invention relates generally to a vehicle axle beam, and specifically to a method of fabricating a vehicle axle beam with a varying wall thickness.

Conventional solid axle beams have been used for vehicle axles. The solid axle beam provides a rigid, durable structure capable of withstanding the bending and torsional loads typically encountered. The bending and torsional loads on an axle beam are not uniform. Some segments of the axle beam experience less loading then other segments and may not require the same structure. A solid axle beam is relatively heavy and adds considerable weight to a vehicle.

Conventional hollow axle beams reduce weight while still providing the structure to bear the bending and torsional loads encountered by a vehicle axle. Typically, a hollow axle beam is formed from a round or square tube section. Round or square tube sections are typically formed from a single sheet of material rolled or folded to abut along longitudinal segments. The seam formed by the abutted longitudinal segments is then welded. A square tubular section provides favorable bending loading performance. Bending loads are primarily carried across two sides of the square beam. The two loaded sides are required to be of a minimum thickness. Disadvantageously, non-loaded sides of the square tube are of the same minimum thickness required of the loaded sides.

Accordingly, it is desirable to design an axle and method of fabricating an axle having a wall thickness tailored to the expected load.

SUMMARY OF THE INVENTION

The present invention is an axle beam and method of fabricating an axle beam that includes a tailored wall thickness in cross-section to accommodate bending loads.

The axle beam assembly of this invention includes a square tube having a top section, a bottom section and two side sections. The top and bottom sections are of a first thickness that is greater than the thickness of material of the side sections. The top and bottom sections are the primary load bearing sections for loads exerted on the axle. Therefore, the top and bottom sections are of increased thickness and the side sections that encounter a reduced load are of a reduced thickness. This provides a more efficient use of material.

Accordingly, the axle and method of fabricating an axle of this invention provides a wall thickness tailored to expected loads.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
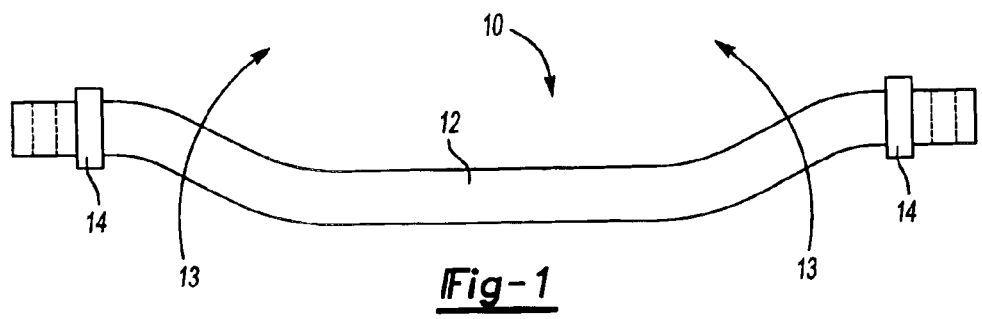
FIG. 1 is a plan view of an axle according to this invention.

Referring to FIG. 1, an axle assembly 10 includes a hollow axle beam 12 and king pin bosses 14 for mounting of a vehicle wheel. The hollow axle beam 12 is formed from a single sheet of material folded to form a closed shape. The axle beam 12 includes a cross-section composed of walls of thicknesses tailored to support differing loads across different sections. The axle assembly 10 illustrated in FIG. 1 is a drop axle and is only one of many possible configurations that would benefit from this invention.

Figure 2:
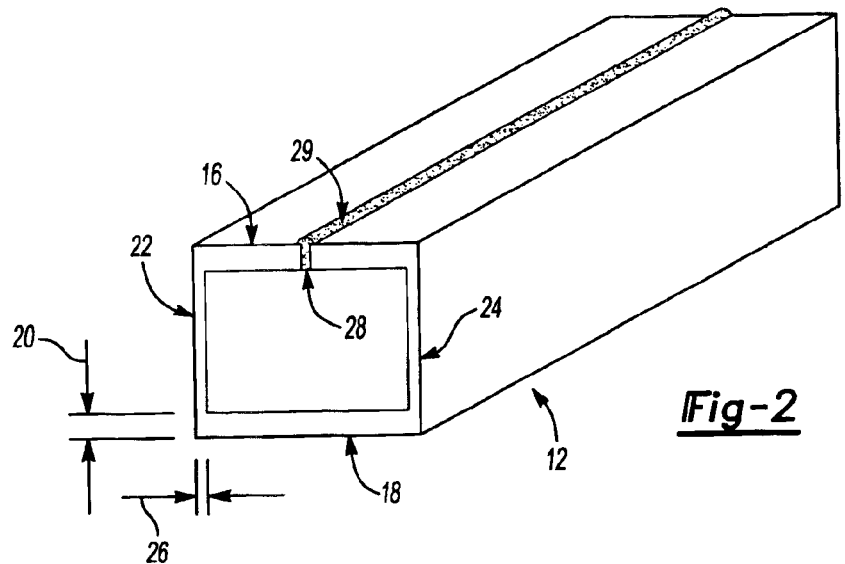
FIG. 2 is a tubular section according to this invention.

Referring to FIG. 2, the variable thickness of the axle beam 12 formed by this method allocates material according to application loading requirements. Square hollow members are preferred for support of bending loads on the axle beam 12. These bending loads (schematically shown by arrows 13 in FIG. 1) are greater on top and bottom sections 16, 18 of the beam 12 than on first and second side sections 22, 24. The top and bottom sections 16, 18 include an increased thickness compared to the first and second side sections 22, 24 that do not support a significant portion of the bending loads.

The axle beam 12 is shown in cross-section with each section having a tailored thickness. Preferably, the cross-section is constant along the entire length of the axle beam 12. The top and bottom sections 16,18 include a first thickness 20. The first thickness 20 provides sufficient material to support loads applied on the axle beam 12. The first and second side sections 22,24 are of a second thickness 26, thinner than the first thickness 20. The thickness of material of the top and bottom sections 16,18 relative to the thickness 26 at the first and second side sections 22,24 is application dependent. A worker skilled in the art with the benefit of this disclosure would understand the specific dimensions required to support the applicable loads for any specific axle beam 12. Further, it should be understood that a tubular axle member having differing number of sides will likely benefit from this invention.

The axle beam 12 is preferably formed by folding a single sheet of material onto itself to form a closed shape. A seam 28 is welded to secure abutted ends of the sheet of material together. The terms, top, bottom and sides are used for explanation purposes relative to normal vehicle orientation. In practice, the specific position of the thicker and thinner faces of the axle beam 12 would correspond to application specific loading requirements.

Figure 3:
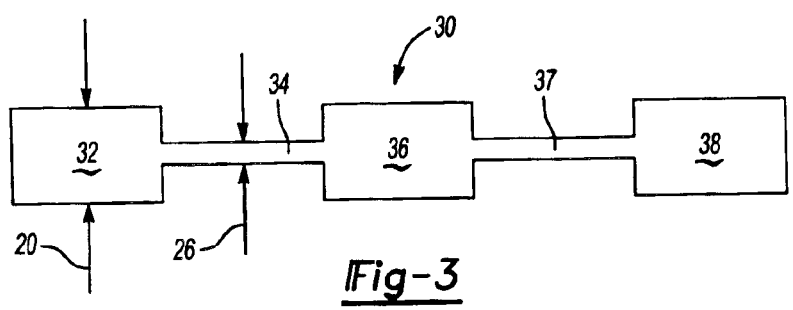
FIG. 3 is a schematic view of a stepped plate prior to fabrication of the tubular section.

Referring to FIG. 3, the axle beam 12 is formed with a stepped plate 30. The stepped plate 30 includes five segments 32,34,36,37, and 38 orientated to form an enclosed shape. The first and fifth segments 32,38 are of the first thickness 20 and form the top section 16 of the axle beam 12. The second and fourth segments 34 and 37 include the thickness 26, and form the first and second side sections 22,24. The third segment 36 is of the first thickness 20 and forms the bottom section 18. The first and fifth segments 32, 38 are folded to abut longitudinally and form the seam 28 along the top section 16 of the axle beam 12. A weld 29 along the seam 28 of the first and fourth segments 32, 34 forms the closed square shaped axle beam 12.

Preferably, the seam 28 is welded such that the abutted first and fifth segments 32, 38 are permanently attached to each other to form the rigid axle beam 12. A worker skilled in the art with the benefit of this invention would understand that any welding method or location can be used to permanently attach ends of the plate that form the seam 28

Figure 4:
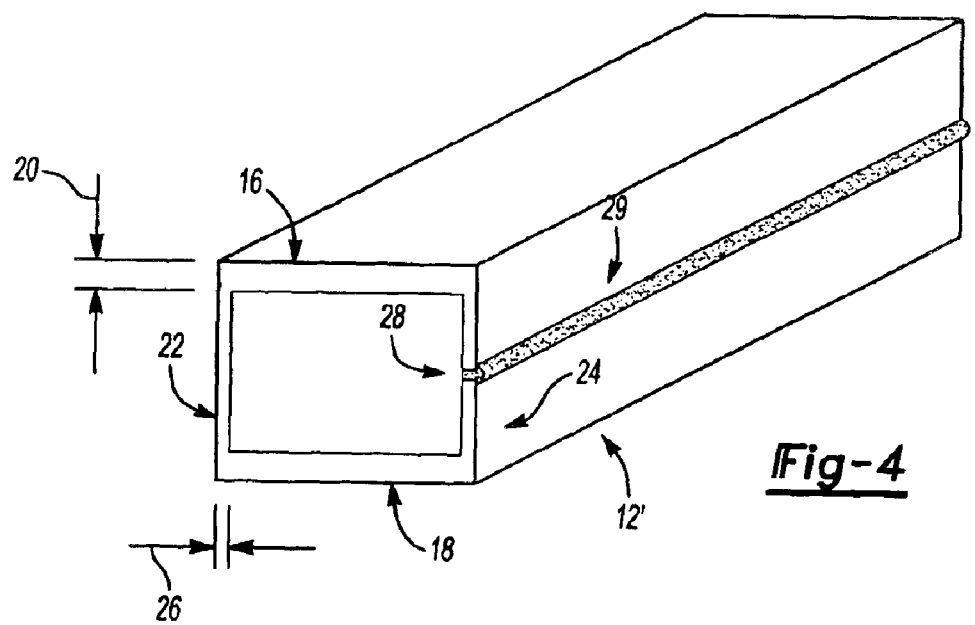
FIG. 4 is another tubular section according to this invention.

Referring to FIG. 4, another axle beam 12' according to this invention includes the seam 28 disposed on one of the first and second side sections 22, 24. The top and bottom sections 16,18 remain composed of the first thickness 20 that is greater than the second thickness 26 of the first and second side sections 22,24. Because the seam 28 is disposed within one of the first and second side sections 22, 24 another stepped plate configuration is used. Placing the seam 28 on one of the first and second side sections 22,24, removes the weld 29 from the load bearing top and bottom sections 16, 18. In some axle beam applications, it may be advantageous to eliminate the seam 28 from the load carrying sections.

Figure 5:
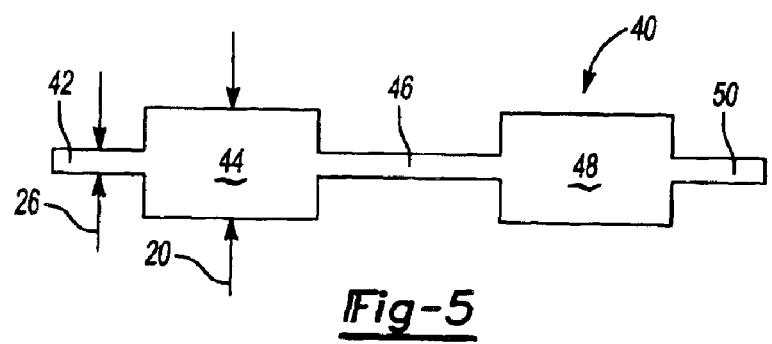
FIG. 5 is a stepped plate for fabricating the tubular section shown in FIG. 4.

Referring to FIG. 5, a stepped plate 40 used to fabricate the axle beam 12' with the seam 28 on one of the first and second side sections 22, 24. The stepped plate includes five segments 42,44,46,48, and 50. The second and fourth segments 44, 48 include the first thickness 20 to form the top and bottom sections 16,18 of the axle beam 12'. First, third and fifth segments 42, 46, 50 are of the thickness 26 that will form the first and second side sections 22, 24. The plate 40 is folded onto itself to abut the first and fifth segments 42,50 and form the seam 28. The seam 28 is subsequently welded to form the closed shape. Preferably, the seam 28 is welded such that the abutted first and fifth segments 42, 50 are permanently attached to each other to form the rigid axle beam 12.

Figure 6:
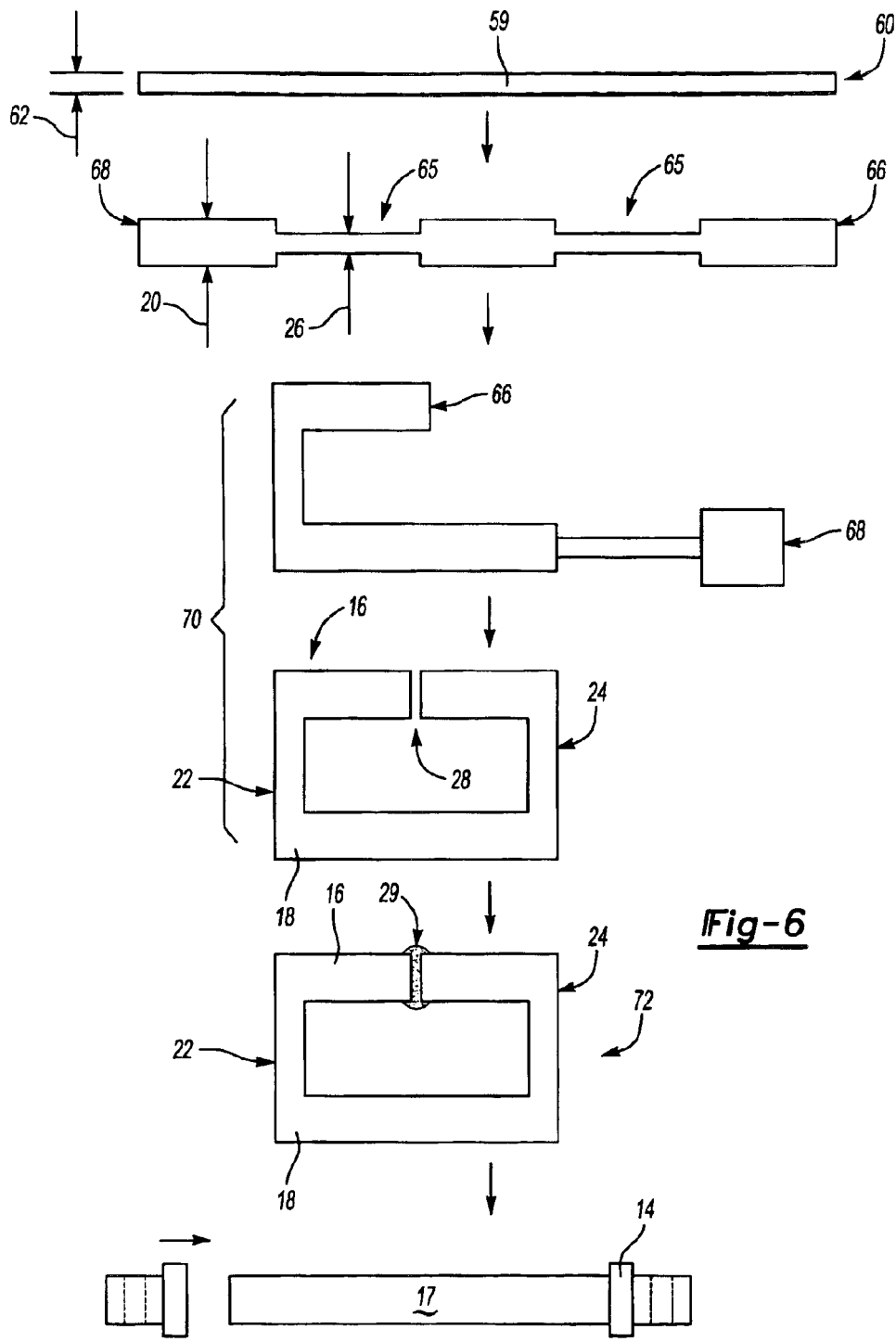
FIG. 6 is a schematic representation of the method of fabricating a tubular section for an axle beam.

Referring to FIG. 6, a method for fabricating an axle beam 12 having a tailored thickness about the cross-section is illustrated. The initial step indicated at 60 includes a plate 59 having a thickness 62. The thickness 62 is uniform throughout the plate 59. Preferably, the thickness 62 across the entire plate 59 is of the final thickness dimension required for the top and bottom sections 16,18 of the completed axle beam 12. A process indicated at 64 deforms the plate 59 such that stepped segments 65 are formed having tailored thicknesses. The process indicated at 64 can be a stamping or rolling process to shape the cross-section of the plate 60. Further, the method of this invention may begin with a plate formed as indicated at 64 complete with the desired variations in thickness.

The plate 59 with the variable thickness cross-section is then folded longitudinally as indicated at 70. Segments 66 and 68 are abutted against each other to form the closed structure of the axle beam 12. The axle beam 12 includes the thicker sections of the first thickness 20 across the top and bottom sections 16,18 and the thinner walls of the second thickness 26 across the first and second side sections 22,24. The abutted segments 66,68 form the top section 16. The seam 28 created between the abutted segments 66,68 is then welded as indicated at step 72. Once the tubular member is completed and the seam 28 welded, kingpin bosses 14 or other desired end assemblies are attached as indicated at 74.

The axle beam 12 of this invention includes a cross-section composed of walls of thicknesses tailored to support differing loads across different sections. The load specific allocation of material reduces overall axle assembly weight while supporting expected loads. The tailored wall thickness of this invention may be applied to axle beams of differing geometries according to application specific requirements.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of fabricating an axle beam comprising the steps of:

a) bending a plate having a varied cross-section to form an enclosed shape with first and second segments abutting each other; and b) joining the first segment and the second segment to each other, wherein the first segment and the second segment comprise one of a top section and a bottom section of the axle beam.

2. The method as recited in claim 1, wherein step a) comprises deforming the plate into a stepped cross-section from a plate having a uniform cross-section.

3. The method as recited in claim 2, wherein the plate includes a length and a width, the length greater than the width and the stepped cross-section extends longitudinally along the plate.

4. The method as recited in claim 3, wherein said step a) comprises bending the plate laterally such that longitudinal edges of the plate abut and the first segment and the second segment forming the enclosed shape.

5. The method as recited in claim 1, comprising attaching end assemblies to distal segments of the axle beam.

6. The method as recited in claim 1, wherein the first segment and the second segment are of a common thickness.

7. The method as recited in claim 1, comprising a third segment and a forth segment having a thickness less than the first segment and the second segment.

8. The method as recited in claim 1, wherein the enclosed shape includes a first side section and a second side section wherein the top section and the bottom section are of a greater thickness than the first side section and the second side section.

9. A method of fabricating an axle beam for a vehicle comprising the steps of:

a) bending a plate having a varied cross-section into an enclosed shape with a first segment and a second segment abutting each other;

b) joining the first segment to the second segment to form one of a top section and a bottom section; and c) attaching end assemblies adjacent distal ends of the axle beam.

10. The method as recited in claim 9, including a third segment and a fourth segment each having a thickness less than a thickness of the first segment and the second segment.

11. The method as recited in claim 9, wherein the end assemblies comprise king pin bosses.

* * * * *